United States Patent
Harvey

[11] 3,892,072
[45] July 1, 1975

[54] VARIABLE SPEED HYDRAULIC TRANSMISSION

[76] Inventor: Benjamin F. Harvey, F-61 Country Corners, Athens, Ga. 30601

[22] Filed: May 10, 1973

[21] Appl. No.: 358,937

[52] U.S. Cl. .............................. 60/487; 417/273
[51] Int. Cl. ............................................ F16h 39/46
[58] Field of Search .............. 60/487; 417/273, 269

[56] References Cited
UNITED STATES PATENTS

| | | | |
|---|---|---|---|
| 1,477,300 | 12/1923 | Thrift | 417/273 |
| 1,785,736 | 12/1930 | Hess | 74/568 |
| 2,263,786 | 11/1941 | Rumpp | 417/273 |
| 3,161,137 | 12/1964 | Thoma et al. | 60/487 |
| 3,451,218 | 6/1969 | Grant | 60/487 |

FOREIGN PATENTS OR APPLICATIONS

| | | | |
|---|---|---|---|
| 760,445 | 11/1932 | France | 47/273 |

Primary Examiner—Martin P. Schwadron
Assistant Examiner—H. Burks, Sr.
Attorney, Agent, or Firm—Clarence A. O'Brien; Harvey B. Jacobson

[57] ABSTRACT

A rotary input shaft is provided having an axially shiftable cam mounted thereon including circumferentially spaced and axially tapering cam lobes. A pair of reciprocating piston oil pumps are provided and include piston actuating followers engaged with the cam and operable thereby to pump oil through the pumps. An oil turbine is also provided and oil lines extend to and from the turbine from the pumps whereby operation of the pumps will cause oil to be pumped through the turbine which includes a rotary output shaft. By axially shifting the cam on the rotary input shaft the volume of oil pumped by the pumps during each cycle of operation thereof is varied whereby the input of oil to the turbine is similarly varied. The hydraulic system connecting the pumps to the turbine includes oil reservoir means from which oil may be admitted into the working portion of the system and into which oil from the working portion of the system may be withdrawn. Further, structure is provided for expressing oil from the reservoir in response to shifting of the cam to increase the discharge from the pumps and to withdraw oil from the working portion of the hydraulic system into the reservoir in response to shifting of the cam to reduce the output of the pumps. In this manner, even though the amount of oil pumped into and out of the pumps during each cycle of operation thereof varies with the axial shifting of the cam, a closed hydraulic system may be maintained.

4 Claims, 4 Drawing Figures

VARIABLE SPEED HYDRAULIC TRANSMISSION

The main object of this invention, is to provide a variable speed hydraulic transmission which will be capable of infinitely varying the speed of rotation of an output shaft relative to the speed of rotation of an input shaft.

Another object of this invention, in accordance with the immediately preceding object, is to provide a hydraulic transmission in accordance with the preceding object and which may be maintained fully closed and yet be capable of automatically compensating for the volume of working hydraulic fluid in the system as the speed of the output shaft is varied relative to the speed of the input shaft.

Another important object of this invention is to provide a variable speed hydraulic transmission utilizing reciprocating piston hydraulic pumps and including pump actuating structure which will be capable of delivering hydraulic fluid under pressure at a substantially constant rate to the power output turbine of the transmission.

Another object of this invention to be specifically enumerated herein is to provide a variable speed hydraulic transmission which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
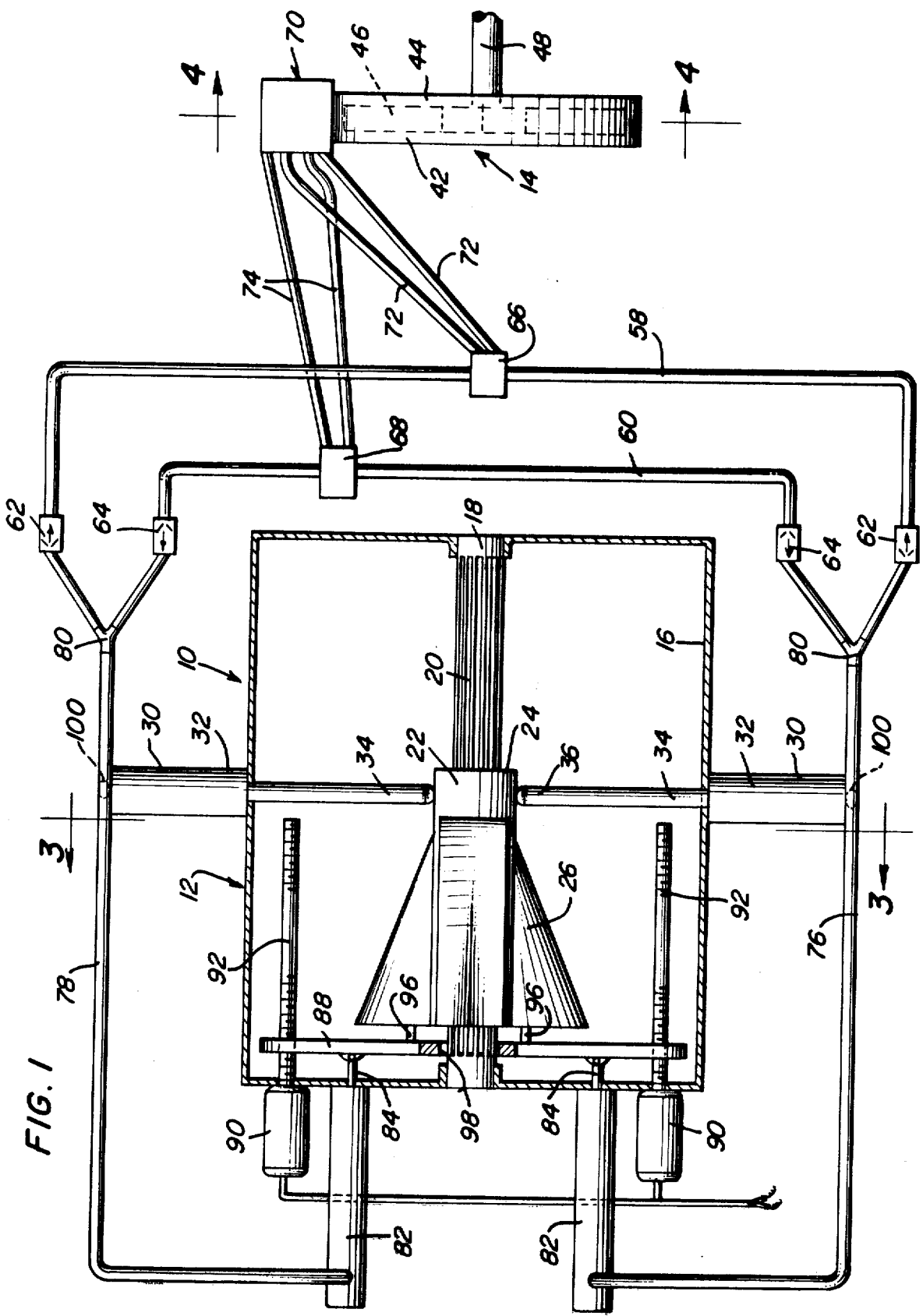
FIG. 1 is a longitudinal sectional view taken substantially upon a plane passing through the center of the reciprocating pump actuating structure of the transmission and with the hydraulic system of the transmission schematically illustrated.

Referring now more specifically to the drawings, the numeral 10 generally designates the variable speed hydraulic transmission of the instant invention. The transmission 10 includes a hydraulic pump section referred to in general by the reference numeral 12 and a fluid turbine section referred to in general by the reference numeral 14. The pump section 12 includes a hollow body 16 through which a rotary input shaft 18 is journaled. Either end of the input shaft 18 may be driven from a suitable power source (not shown).

The central portion of the shaft 18 includes longitudinal splines 20 and a cam body 22 is slidably mounted on the shaft 18 for rotation therewith. The cam body 22 includes splines complementary to the splines 20.

The cam body includes a central cylindrical core 24 and three axially tapering and equally circumferentially spaced cam lobes 26. A pair of opposite side reciprocating piston pumps 30 are carried by opposite side portions of the body 16 and each pump 30 includes a cylinder 32 having a piston (not shown) mounted on a piston rod 34 and slidable in the cylinder 32. The piston rods 34 extend along diametric radii of the cam body and shaft 18 and the adjacent ends of the piston rods 34 comprise followers 36 engageable with the lobes 26 on the cam body 22.

A hydraulic turbine referred to in general by the reference numeral 38 is provided and includes a cylindrical casing 40 between whose opposite end walls 42 and 44 a rotor 46 is journaled, the rotor 46 including a power output shaft 48. The rotor 46 is provided with diametrically opposite lobes 50 which sweep the interior of the casing 40 and also fluid inlet and outlet fittings 52 and 54 as well as a spring biased and radially shiftable vane 56 disposed between the fittings 52 and 54.

An input line or conduit 58 for oil under pressure is provided as well as a return line 60. The opposite ends of the return line 58 have check valves 62 serially disposed therein whereby oil under pressure may enter the ends of the input line 58 but may not be discharged therefrom and the opposite ends of the return line 60 have check valves 64 serially connected therein whereby oil under pressure may be discharged from the opposite ends of the return line 60 but may not be admitted thereinto. The intermediate portion of the input line 58 includes a junction block 66 and the intermediate portion of the return line 60 includes a junction block 68.

Any suitable form of reversing valve referred to in general by the reference numeral 70 is operatively associated with the fittings 52 and 54 and a pair of input lines 72 extend from the block 66 to the valve 70 while a pair of return lines 74 extend from the valve 70 to the junction block 68.

A pair of main supply lines 76 and 78 are provided and one pair of corresponding ends of the supply lines 76 and 78 are communicated, by means of wire fittings 80, to corresponding pairs of ends of the input and return lines 58 and 60. In addition, the other pair of corresponding ends of the supply lines 76 and 78 open into oil defining cylinders 82 which generally parallel the shaft 18 and are disposed on diametrically opposite sides thereof. The cylinders 82 have pistons (not shown) slidably disposed therein and piston rods 84 connected to those pistons project endwise outwardly of the ends of the cylinders 82 remote from the adjacent ends of the supply lines 76 and 78. The free ends of the piston rods 84 are connected to a mounting plate 88 supported within the body 16 and electric motors 90 are supported from the body 16 on the remote sides of the cylinders 82 and include threaded rotary output shafts 92 which are threaded through diametrically opposite portions of the mounting plate 88. The motors 90 are of the reversible type and antifriction means 96 are utilized to connect the mounting plate 88 to the cam body 22. In this manner, alternating reverse operation of the electric motors 90 will cause the mounting plate 88 and the cam body 22 to be shifted back and forth along the shaft 18, the mounting plate 88 having a central opening 98 formed therethrough in which the shaft 88 is loosely received.

In operation, and assuming the components of the hydraulic pump section 12 are positioned as illustrated in FIG. 1, rotation of the shaft 18 results in no reciprocation of the piston rods 34 and thus no hydraulic fluid under pressure is supplied to the fluid turbine section 14. However, when the motors 90 are simultaneously operated (from any suitable source of electrical potential) in a manner to cause the mounting plate 88 to shift to the right as viewed in FIG. 1 of the drawings, the cam body 24 will be shifted toward the position thereof illustrated in FIG. 2 whereby the cam lobes 26 will cause reciprocation of the piston rods 34. The outer ends of the cylinders 32 are communicated with the supply lines 76 and 78 as at 100 and therefore it may be seen that during reciprocation of the piston rods 34 oil will be drawn into and pumped out of the cylinders 32. Of course, because of the valves 62 and 64, when oil is pumped out of the cylinders 32 oil is pumped into the input line 58 and from the latter through the lines 72 to the valves 70. When the piston rods are urged outwardly by the cam lobes 26, the hydraulic fluid or oil passes from the fluid turbine section 14 through the lines 74, into the line 60 and from the line 60 into the cylinders 32.

Figure 3:
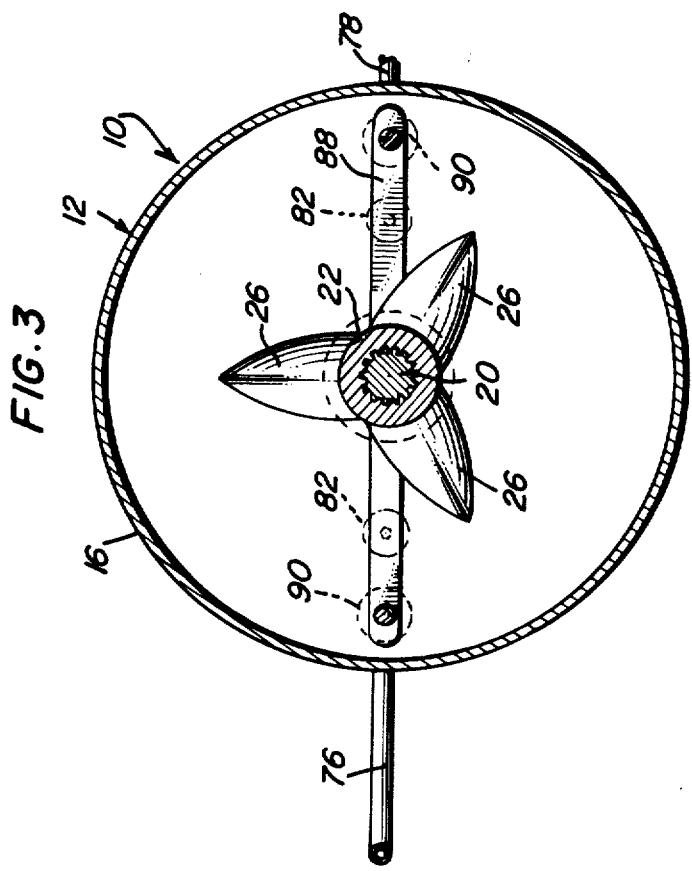
FIG. 3 is a transverse sectional view taken substantially upon the plane indicated by the section line 3—3 of FIG. 1.

From FIG. 3 of the drawings it may be seen that the diametrically opposite piston rods, which are disposed diametrically opposite each other, will be inversely reciprocated by the three equally spaced lobes 26. Therefore, when one piston rod 34 is moving outwardly in order to pump fluid from the corresponding cylinder into the casing 40 through one of the fittings 52 and 54, fluid will be discharged from the casing 40 through the other fitting thereof and into the return line 60 and the opposite cylinder 32. In this manner, there need not be a positive connection between the cam body 22 and the piston rods 34 nor spring means operatively associated with the piston rods 34 in order to yieldingly bias the latter radially inwardly toward the shaft 18. Of course, the valve 70 is capable of selectively directing the fluid under pressure supplied thereto to the fittings 52 and 54 whereby the power output shaft 48 may be driven in opposite directions.

Figure 2:
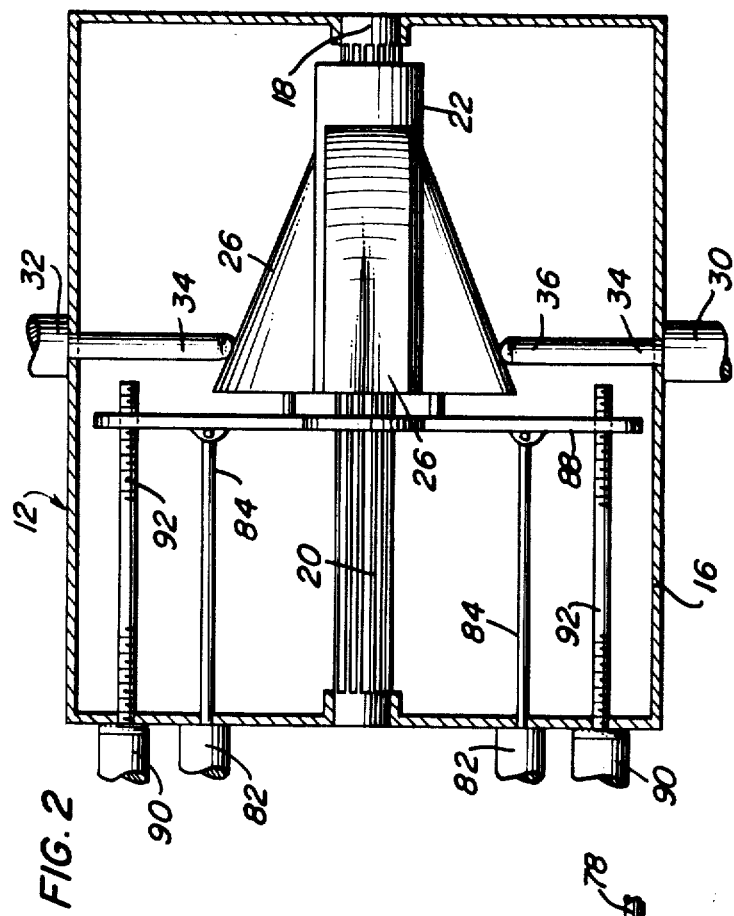
FIG. 2 is a fragmentary sectional view similar to FIG. 1 but illustrating the axially shiftable cam of the transmission in an alternate position.
Figure 4:
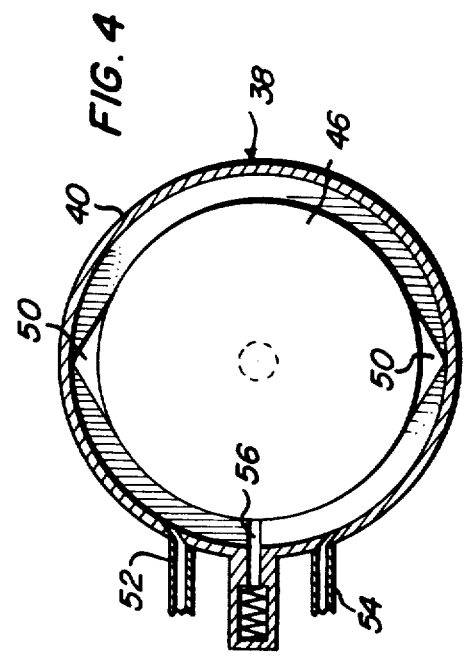
FIG. 4 is a fragmentary sectional view taken substantially upon the plane indicated by the section line 4—4 of FIG. 1.

When the cam body 22 is shifted to the right as viewed in FIG. 1 of the drawings toward the position thereof illustrated in FIG. 2, it may be seen that at any given angular position of the cam body 22 a greater amount of hydraulic fluid will be displaced from at least one of the cylinders 32. In order to compensate for this additional fluid being expressed from the cylinder, the cylinders 82 have their working volume increased by movement of the mounting plate 88 to the right as viewed in FIGS. 1 and 2 of the drawings whereupon the excess amount of hydraulic fluid may be drawn into the cylinders 82. In this manner, the hydraulic system comprising the cylinders 32 and 82 as well as the various lines and the fluid turbine section 14 may be maintained substantially closed and any excess amount of fluid being pumped out of or into the cylinders 32 upon axial shifting of the cam body 22 will automatically be compensated for by corresponding axial shifting of the piston rods 84 of the cylinders 82.

It is also to be understood that the valve 70 is capable of communicating the adjacent ends of the lines 72 and 74 without passing hydraulic fluid through the turbine. In this manner, even though the cam body 22 may be shifted to the position thereof illustrated in FIG. 2 of the drawings, the fluid turbine section 14 may be maintained inoperative.

It is to be noted that whenever the cam body is axially shifted to a position so that the cam lobes 26 will engage the adjacent ends of the piston rods 34, substantially constant spacing will be maintained between the piston rods 34. That is to say, as one piston rod 34 reaches the peak of one lobe 26 anywhere along its axial extent the opposite piston rod 34 will be disposed in the valley between adjacent lobes and that as one piston rod 34 is moved toward the center axis of the cam body 22 the opposite piston rod will move an equal amount away from the center axis of the cam body 22. Thus, the fluid volume compensating structure comprising the cylinders 82 and their piston rods 84 need not compensate for any changes in the volume of working fluid when the cam member is maintained in axially shifted position. Compensation for the volume of working fluid is made only during axial shifting of the cam body 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a rotary input shaft, a cam body mounted on said shaft for rotation therewith and adjustable shifting therealong, said cam body including radially outwardly projecting and axially tapering cam means, liquid pump means including reciprocal piston means and back and forth shiftable actuator means having a follower portion engaged with said cam body, said pump means including liquid inlet and outlet means, a liquid motor including a liquid inlet and a liquid outlet, liquid conveying means communicating said liquid inlet and said liquid outlet with said liquid inlet and outlet means, closed variable volume liquid reservoir means communicated with said liquid conveying means and including shiftable operator means operative to vary the effective volume of said reservoir means, and motion transmitting means operatively connecting said shiftable operator means and said cam body for shifting the former in response to shifting of the latter to increase and decrease the effective volume of said liquid reservoir means for receiving and expelling liquid displaced from said outlet means and to be drawn into said inlet means, respectively, as a result of reciprocal shifting of said piston means upon back and forth shifting of said actuator means.

2. The combination of claim 1 wherein said cam body includes three evenly circumferentially spaced axially tapering lobes engageable with said actuator means, said pump means comprising a pair of reciprocating piston pumps arranged along diametrically opposite radii of said shaft, said pumps including piston rod portions comprising said actuator means and reciprocal along said radii.

3. The combination of claim 1 wherein said fluid motor is of the positive displacement type.

4. The combination of claim 3 wherein said cam body includes three evenly circumferentially spaced axially tapering lobes engageable with said actuator means, said pump means comprising a pair of reciprocating piston pumps arranged along diametrically opposite radii of said shaft, said piston pumps including piston rod portions comprising said actuator means and reciprocal along said radii, the lobes of said cam body being of cross-sectional profiles such that in any given axially shifted position of said cam body with said piston rod portions engaged with said lobes the spacing between the adjacent ends of said piston rod portions remains substantially constant throughout reciprocation of said piston rod portions.

* * * * *